(12) United States Patent
Badurina

(10) Patent No.: US 9,975,690 B2
(45) Date of Patent: May 22, 2018

(54) LEASH ATTACHED ANIMAL WASTE DISPOSAL UNIT WITH FLASHLIGHT

(71) Applicant: Alice Badurina, Harrison, NY (US)

(72) Inventor: Alice Badurina, Harrison, NY (US)

( * ) Notice: Subject to any disclaimer, the term of this patent is extended or adjusted under 35 U.S.C. 154(b) by 254 days.

(21) Appl. No.: 15/156,422

(22) Filed: May 17, 2016

(65) Prior Publication Data

US 2017/0233170 A1  Aug. 17, 2017

Related U.S. Application Data

(60) Provisional application No. 62/294,942, filed on Feb. 12, 2016.

(51) Int. Cl.
| | | |
|---|---|---|
| *A01K 27/00* | (2006.01) |
| *B65D 83/00* | (2006.01) |
| *B65D 83/08* | (2006.01) |
| *B65D 43/26* | (2006.01) |
| *B65F 1/00* | (2006.01) |
| *B65D 21/02* | (2006.01) |
| *B65H 16/00* | (2006.01) |

(52) U.S. Cl.
CPC ........ *B65D 83/0888* (2013.01); *A01K 27/006* (2013.01); *A01K 27/008* (2013.01); *B65D 21/0209* (2013.01); *B65D 43/26* (2013.01); *B65D 83/0805* (2013.01); *B65F 1/0006* (2013.01); *B65H 16/005* (2013.01); *B65F 2240/136* (2013.01)

(58) Field of Classification Search
CPC .. A01K 27/008; A01K 23/005; A01K 27/003; E01H 2001/128; E01H 2001/1286; E01H 2001/1273; B65D 83/0888; B65D 83/0805

USPC ................................. 119/161, 769, 770, 795
See application file for complete search history.

(56) References Cited

U.S. PATENT DOCUMENTS

| | | | | |
|---|---|---|---|---|
| 5,054,612 A | * | 10/1991 | Meyer, Jr. .......... | B65D 83/0888 206/233 |
| 5,713,616 A | * | 2/1998 | Knudson ............... | E01H 1/1206 206/223 |
| 6,035,809 A | | 3/2000 | Fingerett et al. | |
| 6,073,590 A | | 6/2000 | Polding | |
| 6,199,737 B1 | | 3/2001 | Ringelstetter | |
| 6,257,473 B1 | | 3/2001 | Ringelstetter | |
| 6,418,881 B1 | * | 7/2002 | Starratt ................ | A01K 27/006 119/769 |
| 6,454,119 B1 | | 9/2002 | Demeur et al. | |

(Continued)

*Primary Examiner* — Yvonne R Abbott-Lewis
(74) *Attorney, Agent, or Firm* — Economou Silfin LLP; John S. Economou

(57) ABSTRACT

A pet waste collection system includes a first component and a second component detachably connected to each other. The first component has a first inner area to hold a roll of dog waste bags that is formed from a solid outer cylindrical wall and a solid bottom. A first flap encloses a top portion of the first inner area and has an aperture retrieving a dog waste bag. A pushbutton latch secures and releases the first flap. A hook attaches the first component to a dog leash. The second component has a second inner area for holding a filled dog waste bag and is formed from an outer cylindrical wall including a plurality of perforations and a solid bottom. A second flap encloses a top portion the second inner area. A pushbutton latch secures and releases the second flap. A hook attaches the second component to a dog leash.

5 Claims, 3 Drawing Sheets

(56) References Cited

U.S. PATENT DOCUMENTS

| | | | | |
|---|---|---|---|---|
| 7,073,462 B1* | 7/2006 | Layman | ............... | A01K 27/006 119/161 |
| 7,695,034 B2 | 4/2010 | Anderson | | |
| 8,353,603 B2* | 1/2013 | Berry | ................... | A01K 27/006 362/108 |
| 8,397,915 B2* | 3/2013 | Davidson | ............... | A45C 11/00 119/161 |
| D724,843 S | 3/2015 | Abbott | | |
| D727,577 S* | 4/2015 | Lanich | ........................ | D30/153 |
| 9,049,910 B1 | 6/2015 | Bakali | | |
| 9,078,417 B1 | 7/2015 | Lees et al. | | |
| 9,861,078 B1* | 1/2018 | Mantelli | ............... | A01K 27/008 |
| 2006/0054107 A1* | 3/2006 | Baker | ................ | A01K 23/005 119/795 |
| 2006/0231043 A1* | 10/2006 | Galdo | ................. | A01K 27/006 119/796 |
| 2007/0045333 A1* | 3/2007 | Mitchell | ............... | A47K 10/424 221/34 |
| 2007/0241123 A1* | 10/2007 | Che | ........................ | B65H 35/10 221/64 |
| 2008/0163822 A1* | 7/2008 | Faulkner | ............... | A01K 27/006 119/161 |
| 2009/0095225 A1* | 4/2009 | O'Connell | ........... | A01K 27/006 119/161 |
| 2012/0286003 A1* | 11/2012 | Shadday | ............... | E01H 1/1206 224/191 |
| 2013/0075407 A1* | 3/2013 | Day | ................... | B65D 83/0888 220/500 |
| 2013/0125834 A1* | 5/2013 | Gee | ...................... | A01K 27/003 119/161 |
| 2016/0135432 A1* | 5/2016 | Cox | ..................... | A01K 27/008 119/795 |
| 2017/0215385 A1* | 8/2017 | Hansen | ................ | A01K 27/006 |
| 2017/0233136 A1* | 8/2017 | Cartledge | ............ | A47K 5/1201 222/130 |

* cited by examiner

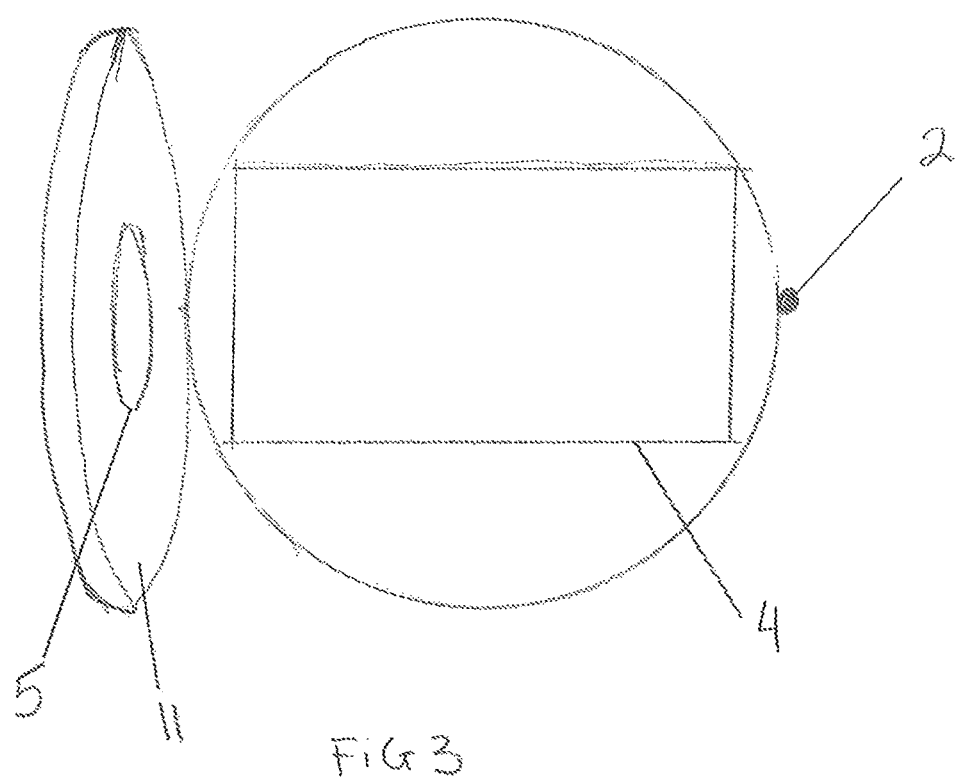

LEASH ATTACHED ANIMAL WASTE DISPOSAL UNIT WITH FLASHLIGHT

FIELD

This device relates generally to the field of animal waste disposal, and more specifically to a multi-purpose system for storing and disposing of pet animal waste.

BACKGROUND

The following includes information that may be useful in understanding the present invention. It is not an admission that any of the information provided herein is prior art, or material, to the presently described or claimed inventions, or that any publication or document that is specifically or implicitly referenced is prior art.

Pet owners enjoy taking their dogs for long walks and bike rides. Most local municipalities require that pet owners collect any solid waste their dog deposits. Often the pet owner will have to hold a leash in one hand and a bag full of waste in their other. This is inconvenient and unsanitary.

Several attempts have been made to solve the problems facing dog walkers who are required to pick up and dispose of solid pet waste. Examples are: U.S. Pat. No. 9,078,417 (2015), U.S. Pat. No. 9,049,910 (2015), U.S. Pat. No. 7,695,034 (2010), U.S. Pat. No. 7,073,462 (2006), U.S. Pat. No. 6,199,737 (2001), U.S. Pat. No. 6,454,119 (2002), U.S. Pat. No. 6,257,473 (2001), U.S. Pat. No. 6,073,590 (2000), U.S. Pat. No. 6,035,809 (2000) and U.S. Pat. No. D724,843 (2015). Some of the patents mentioned above are addressed products which simply carry personal items in addition to dog waste and have certain drawbacks.

For example, the patents cited above that are related to waste holding suffer from a number of disadvantages. For example, the main body is typically constructed in a closed form. Having an enclosed form does not allow waste odor to escape which makes the device unsanitary as well as retaining odors. Further, such devices are typically formed as one unit which does not allow the pet owner the flexibility as to which accessories they need to take depending on the expected journey. For example, if the owner is going for a short walk during the day, only a bag dispenser may be required, yet these devices do not offer the flexibility and require the owner to take the entire unit. Still further, waste storage units made out of fabric are flimsy and difficult to close after placing a bag full of waste into the fabric pouch. Also, waste storage units made out of fabric are difficult to clean as a full washing is required. Finally, enclosed waste storage units cause the pet owner to have to handle the pet waste multiple times, e.g., while inserting the waste and then removing the waste for disposal.

Accordingly, there is a need for a multi-purpose system for storing and disposing of pet animal waste which overcomes the problems recited above.

SUMMARY

In an aspect, a pet waste collection system having a first component and a second component. The first component has a first inner area formed from a solid outer cylindrical wall and a solid bottom. The first inner area is adapted to hold a roll of dog waste bags. A first flap encloses a top portion of the first inner area. An aperture is formed in the flap for retrieving a dog waste bag. A pushbutton latch secures and releases the first flap. A hook attaches the first component to a dog leash. The second component has a second inner area formed from an outer cylindrical wall including a plurality of perforations and a solid bottom. The second inner area is adapted to hold a filled dog waste bag. A second flap encloses a top portion the second inner area. A pushbutton latch secures and releases the second flap. A hook attaches the second component to a dog leash. Finally, means are provided for detachably coupling the first component to the second component.

In one further embodiment, the means for detachably coupling the first component and the second component includes a magnet coupled to the solid bottom of the second component and wherein the solid bottom of the first component is formed from a metal or has a metallic coating.

In another further embodiment, the means for detachably coupling the first component and the second component includes a magnet coupled to the solid bottom of the first component and wherein the solid bottom of the second component is formed from a metal or has a metallic coating.

In yet another further embodiment, the means for detachably coupling the first component and the second component includes threads on an inner mating portion of one of the first component and the second component and matching threads on an outer mating portion of the other of the first component and the second component.

Still further, a flashlight may be coupled to an outer surface of the second flap.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which:

FIG. 3 is a top-view diagram of a waste bag dispenser portion of the multi-portion device according to the present disclosure.

DETAILED DESCRIPTION

In the present disclosure, like reference numbers refer to like elements throughout the drawings, which illustrate various exemplary embodiments of the present disclosure.

Figure 1:
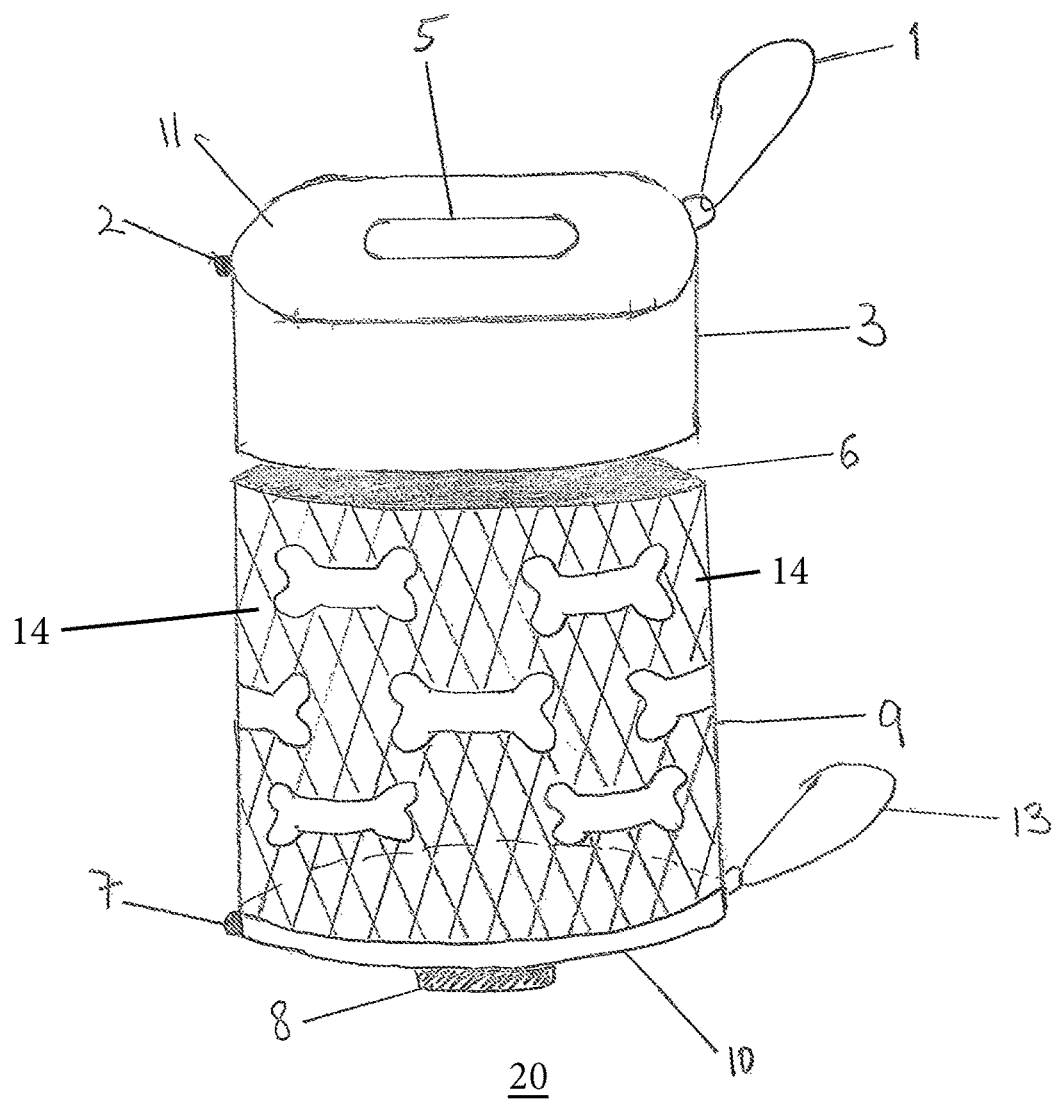
FIG. 1 is a diagram of the multi-purpose device for storing and disposing of animal waste according to the present disclosure.

Referring now to FIG. 1, a leash attached animal waste disposal unit 20 that has a first component 3 consisting of a pet waste bag dispenser, a second component 9 consisting of a solid open concept receptacle for storing pet waste and, preferably, an attached flashlight 8 to aid vision at night. The two components 3, 9 are separable (detachable) portions, and are shown separated in FIG. 1. Components 3 and 9 are preferably connected by a magnet 6 on a bottom solid portion of component 9 that couples to a metallic bottom portion of component 3 (or a metallic coating on the bottom portion of component 3). As evident, magnet 6 may alternatively be placed on the bottom solid portion of component 3 for coupling to a metallic bottom portion of component 9 (or a metallic coating on the bottom portion of component 9). In an alternative embodiment, by utilizing a twist and attach concept similar to how a cap is attached to a water bottle or thermos—e.g., by providing threads on an inner mating portion of one of component 3 and 9 and matching threads on an outer mating portion of the other of component 3 and 9. All required accessories for waste pickup and storage are part of this all-in-one device which enables a pet owner to store said waste in a sanitary and convenient manner until the waste can be disposed of in accordance to local regulations. The second component 9 preferably includes a pushbutton latch 7 which allows the pet owner to dispose of stored waste without having to handle the waste a second time. The flashlight 8 attached to component 9 enables the pet owner to better see at night or when visibility conditions are poor, e.g., to improve visibility for locating dog waste for pickup.

The leash attached animal waste disposal unit 20 helps dog walkers/pet owners to easily and conveniently carry and dispose of dog waste, and provides the essentials needed when walking a pet—bags to collect solid waste, open concept compartment to store waste, and a flashlight to aid visibility at night.

The first component 3 includes a dispenser for bags for waste pickup, which are dispensed through an opening (aperture) 5. Bag rolls may be placed within the first component 3 by pushing pushbutton latch 2 and lifting upper flap 11. Once all the bags on a roll are used, a user may refill first component 3 by again pressing pushbutton latch 2 and opening flap 11. First component 3 also includes a hook (loop) 1 used for attachment to a dog leash.

The second component 9 is formed from a solid material such as an appropriate plastic that is easy to clean. Second component 9 includes openings 14 throughout the outer surface of the structure to provide proper ventilation. This provides much better results when compared to an enclosed pouch or structure which will retain odors from the waste stored within. The bottom of the second component 9 preferably includes an integral flashlight 8 for allowing the pet owner to see better at night. The leash attached animal waste disposal unit 20 may be, as discussed with respect to FIG. 2, attached directly to a regular or retractable leash and is light and easy to clean. Second component 9 also includes a hook (loop) 13 used for attachment to a dog leash.

This detachable concept allows the user the flexibility to take only one of the two components 3, 9 or both components 3, 9, depending on the need for that specific walk. For example, a user may take only component 3 if going for a short walk when only the bag dispenser is required. When going for longer walks, a user may reconnect components 3 and 9 so that both the pet waste storage component 9 and the bag dispenser 3 are available. Once the dog waste is picked up, the user opens flap 10 by pressing pushbutton latch 7 and deposits a bag of pet waste inside. Since the outer walls of component 9 are perforated, odor retention is avoided. Once a user returns to a location where the pet waste can be disposed of, the user can simple press pushbutton latch 7 to open flap 10, and then allow the enclosed pet waste bag to simply fall into a garbage container without any need for the user to again handle the bag.

Figure 2:
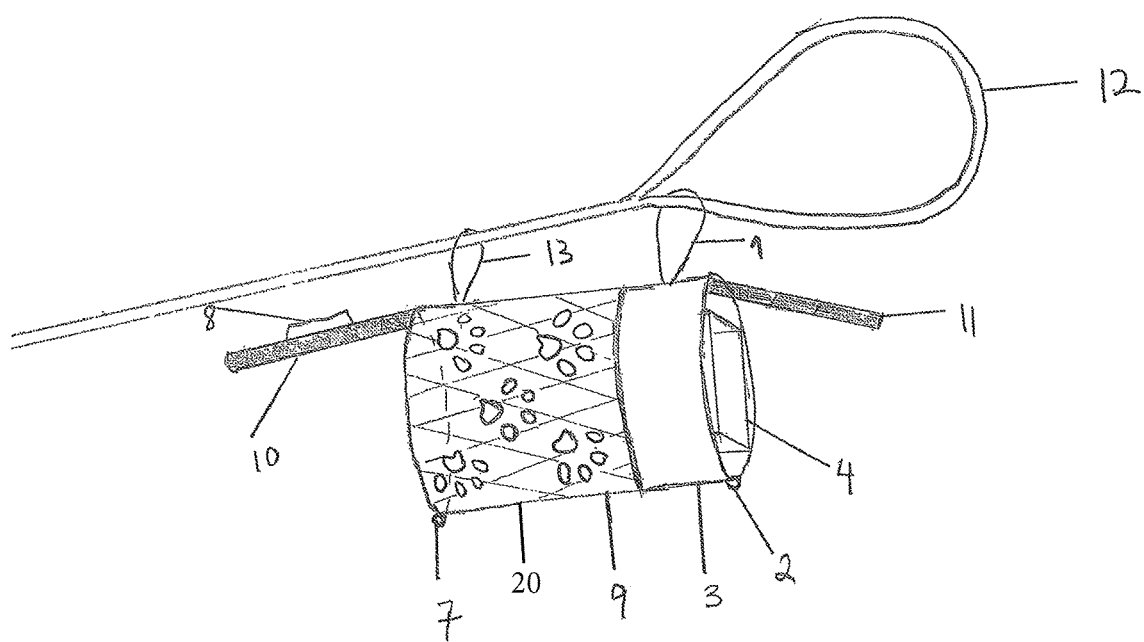
FIG. 2 is a diagram of the multi-purpose device hung horizontally on a leash according to the present disclosure.

FIG. 2 shows the leash attached animal waste disposal unit 20 mounted horizontally on a dog leash 12, utilizing hooks 1 and 13. As evident, components 3 and 9 are coupled together and flaps 10 and 11 are open.

FIG. 3 is a topside view of component 3 with flap 11 open. When all of the pet waste bags have been used, a user can open flap 11 on component 3 by pressing pushbutton latch 2. The user can then insert a new bag roll between walls 4 to ensure that the bag roll is secured firmly within component 3.

While the above description contains many specificities, these should not be constructed as limitations on the scope, but rather as an exemplification of one or several embodiments. Many other variations are possible. For example, the embodiment may be formed in different shapes or colors. Further, the location of flashlight 8 may be moved from the bottom of flap 10 to another location on the device. The embodiment could be made out of different materials such as metal or plastic.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A pet waste collection system, comprising:
   a first component comprising:
      a first inner area formed from a solid outer cylindrical wall, and a solid bottom, the first inner area adapted to hold a roll of dog waste bags,
      a first flap for enclosing a top portion of the first inner area, an aperture formed in the flap for retrieving a dog waste bag,
      a pushbutton latch for securing and releasing the first flap, and
      a hook for attaching the first component to a dog leash;
   a second component comprising:
      a second inner area formed from an outer cylindrical wall including a plurality of perforations, and a solid bottom, the second inner area adapted to hold a filled dog waste bag,
      a second flap for enclosing a top portion the second inner area,
      a pushbutton latch for securing and releasing the second flap, and
      a hook for attaching the second component to a dog leash; and
   means for detachably coupling the first component to the second component.

2. The pet waste collection system of claim 1, wherein the means for detachably coupling the first component and the second component comprises a magnet coupled to the solid bottom of the second component and wherein the solid bottom of the first component is formed from a metal or has a metallic coating.

3. The pet waste collection system of claim 1, wherein the means for detachably coupling the first component and the second component comprises a magnet coupled to the solid bottom of the first component and wherein the solid bottom of the second component is formed from a metal or has a metallic coating.

4. The pet waste collection system of claim 1, wherein the means for detachably coupling the first component and the second component comprises threads on an inner mating portion of one of the first component and the second component and matching threads on an outer mating portion of the other of the first component and the second component.

5. The pet waste collection system of claim 1, further comprising a flashlight coupled to an outer surface of the second flap.

\* \* \* \* \*